United States Patent
Hayter

(12) 
(10) Patent No.: US 6,307,866 B1
(45) Date of Patent: Oct. 23, 2001

(54) BROADBAND TELECOMMUNICATIONS SYSTEM

(75) Inventor: Andrew Timothy Hayter, Southampton (GB)

(73) Assignee: Roke Manor Research Limited, Hampshire (GB)

( * ) Notice: Subject to any disclaimer, the term of this patent is extended or adjusted under 35 U.S.C. 154(b) by 0 days.

(21) Appl. No.: 09/006,188

(22) Filed: Jan. 13, 1998

(30) Foreign Application Priority Data

Jan. 15, 1997 (GB) ................................... 9700684
Mar. 17, 1997 (GB) ................................... 9705472

(51) Int. Cl.[7] ...................................... H04J 3/16
(52) U.S. Cl. ........................... 370/468; 370/235; 370/236
(58) Field of Search .................... 370/395, 397, 370/399, 409, 410, 464, 468, 229, 230, 235, 236 V, 252

(56) References Cited

U.S. PATENT DOCUMENTS

| | | | |
|---|---|---|---|
| 5,737,313 | * 4/1998 | Kolarov et al. | 370/234 |
| 5,754,530 | * 5/1998 | Awdeh et al. | 370/232 |
| 5,777,984 | * 7/1998 | Gun et al. | 370/230 |
| 5,805,599 | * 9/1998 | Mishra et al. | 370/468 |
| 5,966,381 | * 10/1999 | Buckley et al. | 370/395 |

FOREIGN PATENT DOCUMENTS

| | | |
|---|---|---|
| 0678997A1 | 10/1995 | (EP) . |
| WO97/03189 | 1/1997 | (EP) . |
| 2288947 | 11/1995 | (GB) . |
| 2301977 | 12/1996 | (GB) . |

* cited by examiner

Primary Examiner—Ajit Patel
Assistant Examiner—Saba Tsegaye
(74) Attorney, Agent, or Firm—Evenson, McKeown, Edwards & Lenahan, P.L.L.C.

(57) ABSTRACT

A broadband telecommunications system comprises at least one broadband telecommunications switch, and a data transmitter coupled to the broadband telecommunications switch and to each of a plurality of data sources. The system operates to communicate date from the data sources to destinations in the form of a plurality of cells, the communication being arranged to satisfy predetermined transmission parameters. The transmission parameters include an initial cell rate representative of a maximum rate at which data from the data sources may be initially communicated to the telecommunications switch, when the sources become active. By providing the telecommunications switch with a bandwidth allocator which operates to calculate an available bandwidth for allocation between the plurality of data sources in accordance with a number of the data sources which are idle during a predetermined period scaled respectively by each initial cell rate, and operates to allocate the available bandwidth between active data sources, a data storage requirement may be substantially reduced.

6 Claims, 1 Drawing Sheet

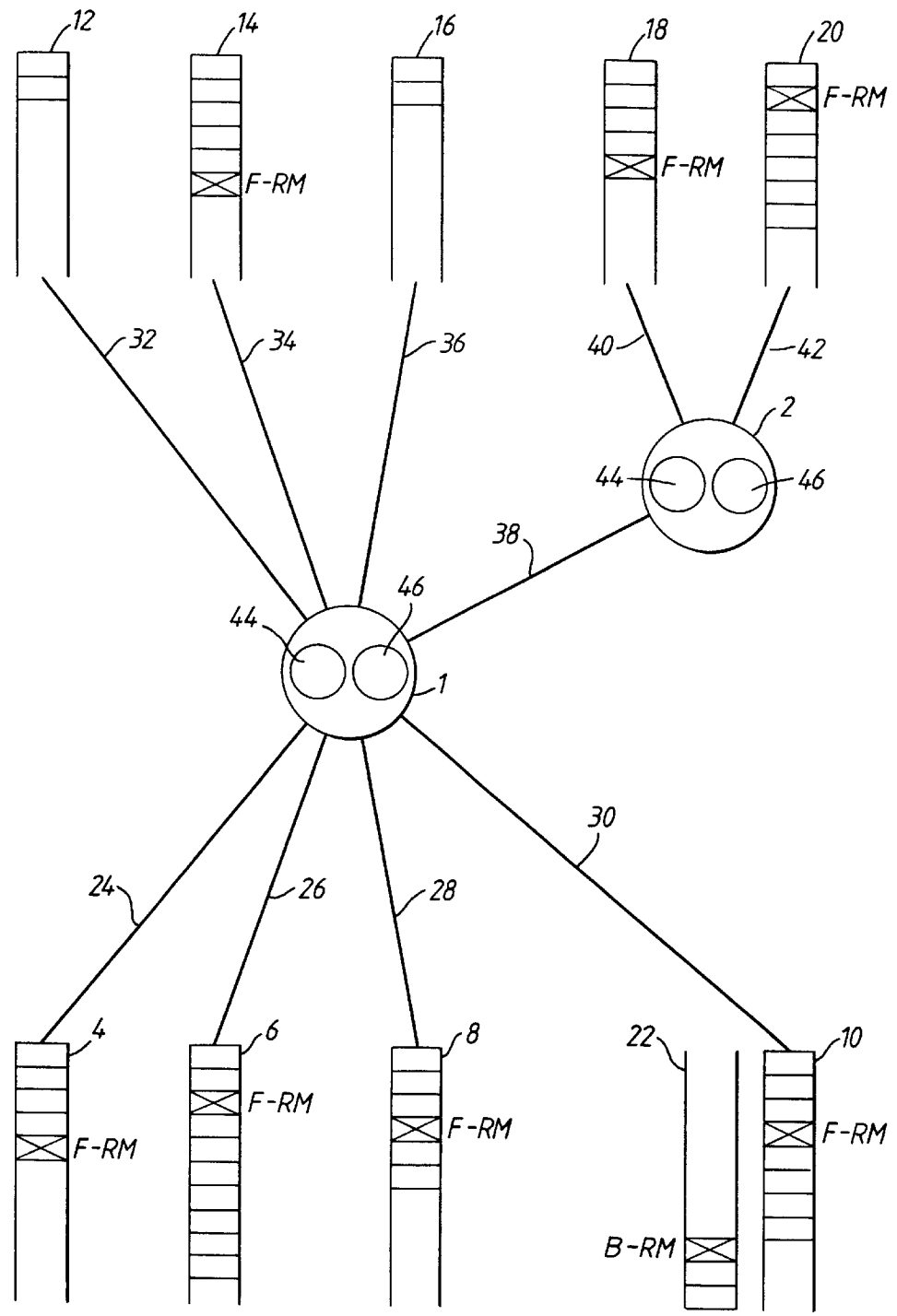

BROADBAND TELECOMMUNICATIONS SYSTEM

The present invention relates to broadband telecommunications systems and in particular, but not exclusively, to telecommunications systems wherein data is communicated using Asynchronous Transfer Mode.

Telecommunications systems which are arranged to communicate data at rates in the order of megabits per second are known as broadband telecommunications systems. Communication of data at such high data rates is arranged to be provided by telecommunications networks between sources of the data and destinations, via nodes or switches which are interconnected by data transmission means. The data transmission means may be radio links in which case the data is conveyed by microwave signals, or fibre optic systems in which case data is communicated by light, or more conventionally data may be conveyed by electrical signals carried by twisted wire pairs.

In order to effect communication of data at such high rates between a plurality of sources, telecommunications systems must make optimum use of an amount of data communications bandwidth provided by a telecommunications network. To this end, broadband telecommunications systems operate to communicate data in the form discrete packets carrying a predetermined amount of information. An example of such a broadband telecommunications system is an Asynchronous Transfer Mode telecommunications system, wherein data is conveyed in ATM cells. Each ATM cell comprises a predetermined quantity of data as well as a cell header, which contains a Virtual Channel Identifier and a Virtual Path Identifier, which are used by nodes or switches to route the ATM cells across the telecommunications network.

Nodes, exchanges or switches which operate, inter alia, to route cells across a telecommunications network will be hereinafter referred to as telecommunications switches.

To achieve an efficient utilisation of a data communications bandwidth provided by a telecommunications network, telecommunications systems operate to provide a predetermined series of data transport media characterised by pre-defined data transmission parameters such as delay, integrity and cell rate. The telecommunications system is therefore arranged to provide a series of virtual communications paths, each of which is arranged to communicate data in accordance with the predetermined transmission parameters. Such communications paths are known as 'bearers' each of which is defined by the attributes of the data which it is able to communicate. Hence, by selecting an appropriate bearer for a certain type of data source, a user of the telecommunications network is provided with a cost effective means for communicating broadband data in accordance with the type and attributes of data the user is generating.

Bearer types which require that data is communicated with a low delay and high integrity, demand that a network links communications bandwidth provided by the telecommunications network is reserved or allocated on demand to such services at a higher priority than data carried by delay tolerant bearers. However, where a data bearer is arranged to communicate data which is delay tolerant, the network links communications bandwidth which remains unused after low delay and high integrity bearer services have been allocated bandwidth, may be allocated for transmission of such delay tolerant data in an efficient manner.

Network links communications bandwidth as used herein refers to a bandwidth provided by a telecommunications network for communication of data of all types whereas, the communications bandwidth, which may be correspondingly represented as a cell rate, which is un-used after the network links communications bandwidth of the telecommunications network has been allocated to low delay or high integrity data sources will be hereinafter known as Available Bit Rate (ABR) bandwidth or, correspondingly an ABR cell rate.

In the case of known Asynchronous Transfer Mode systems, the ATM-Forum have standardised ABR and ABR bearers.

As a result of the tolerance to delays which is characteristic of the data communicated by delay tolerant bearers, the switches of the telecommunications network may be arranged to efficiently utilise the remaining ABR data communications bandwidth by multiplexing data from a plurality of sources arriving at each of the network switches embodied within the telecommunications network. However, in order to provide this efficient bandwidth utilisation, the switches within the telecommunications network must be provided with data storage means arranged to store cells of data received from a particular data source, in order that advantage may be taken of ABR bandwidth as it becomes available on the telecommunications network.

Since each switch in the telecommunications network must be provided with means for data storage, and each switch must provide a facility for data storage for each data source utilising the delay tolerant bearer, the cost of providing such data storage becomes a technical problem.

The technical problem of reducing data storage requirements in a telecommunications system arranged to multiplex data from a plurality of delay tolerant sources onto an ABR data communications bandwidth, is addressed by the present invention.

According to the present invention there is provided a broadband telecommunications system, comprising at least one broadband telecommunications switch, and data transmission means coupled to said at least one telecommunications switch and to each of a plurality of data sources, said system operating to communicate data from said sources to destinations in a form of a plurality of cells, the communication being arranged to satisfy predetermined transmission parameters, which transmission parameters include an initial cell rate representative of a maximum rate at which data from said sources may be initially communicated to said at least one telecommunications switch, when said sources change from an idle to an active state, characterised by the telecommunications switch being provided with a bandwidth allocator which operates to calculate an available bandwidth for allocation between said plurality of data sources in accordance with a number of said data sources which are idle during a predetermined period scaled respectively by each initial cell rate, and operates to allocate said available bandwidth between active data sources, so as to substantially reduce a data storage requirement.

The bandwidth allocator may operate to allocate bandwidth in accordance with a demanded cell rate from each source.

The demanded cell rate may be communicated to said telecommunications switch by a signalling means. The signalling means may be resource management cells communicated between said data sources and said telecommunications switch with the data cells generated by said sources.

The term cells is intended to include packets of data with a fixed or variable size, which packets may also include control or signalling information. ATM cells are one example of such cells.

The calculation of the available bandwidth which may be allocated between sources of delay tolerant data in accordance with the initial cell rate of those data sources which are idle, represents a pessimistic estimate of available ABR bandwidth. This is because this calculation assumes that those data sources which are idle become active at the end of a predetermined period and will transmit at their initial cell rate. However, an effect of this pessimistic calculation is to substantially obviate a requirement for substantial data storage at the telecommunications switch, particularly for data sources which communicate data on the transmission means at cell rates which would otherwise exceed that which can be accommodated by the telecommunications switch. By allocating the pessimistic bandwidth on a basis of the instantaneously demanded cell rates communicated by said data sources delay tolerant data from said plurality of data sources may be multiplexed onto the telecommunications system efficiently utilising the ABR bandwidth without a requirement for a substantial data storage capacity.

The transmission parameters may further include a minimum cell rate, which said telecommunications system operates to provide to said data source, and the available ABR communications bandwidth may be allocated by the bandwidth allocator between said data sources in accordance with the minimum cell rate. ABR bandwidth may be shared equally between sources.

The signalling means may further comprise a resource manager, which operates to generate forward resource management cells communicated to said telecommunications switch with said data cells, and to respond to demand for cell rates from data sources by providing in combination with said bandwidth allocator a cell rate at which said data sources may transmit cells by communicating backward resource management cells to said data cell sources.

The telecommunications system may operate in accordance with Asynchronous Transfer Mode.

According to another aspect of the present invention there is provided a method of allocating a network links communications bandwidth provided by a telecommunications system to a plurality of data sources coupled thereto, comprising the steps of (i) calculating an Available Bit Rate (ABR) communications cell rate for delay tolerant data sources by subtracting from a network links bandwidth represented as a cell rate, a sum of all cell rates allocated to delay critical data sources, (ii) calculating a useable ABR cell rate, which is to be allocated to delay tolerant sources, by subtracting from said ABR communications cell rate a predetermined initial cell rate associated with each of said data sources which are idle, and (iii) allocating a share of said useable ABR cell rate to each of said data sources.

Step (iii) may include allocating said useable ABR cell rate in accordance with the cell rate demanded from each of said data sources.

One embodiment of the present invention will now be described by way of example only, with reference to the accompanying drawing, wherein, FIG. 1 is a schematic block diagram of an ATM telecommunications system.

In FIG. 1, there is shown a schematic block diagram of an ATM telecommunications network, comprising two ATM telecommunications switches 1, 2. The ATM telecommunications network operates to communicate ATM cells from a plurality of sources to a plurality of destination addresses using Virtual Path and Virtual Channel Identifiers, well known to those versed in the art. In FIG. 1, four data sources, 4, 6, 8, 10, and five data sinks or destinations for data 12, 14, 16, 18, 20, are shown. There is also shown a further data sink 22, associated with the data source 10, which is representative of a destination for data associated with the same user generating the source of the data source 10. It will be appreciated that each of the data sources 4, 6, 8, may also have a corresponding data destination or data sink associated therewith, thereby representing an arrangement for duplex communications over the ATM network. Each of the data sources 4, 6, 8, 10, is connected to the ATM switch 1, via transmission means 24, 26, 28, 30, which are representative of means for communicating data in a form of ATM cells between the sources 4, 6, 8, 10 and the ATM switch 1. Further transmission means 32, 34, 36, are shown to connect the ATM switch 1 to the data destinations 12, 14, 16, whilst transmission means 38 connects ATM switch 1 to ATM switch 2 with further transmission means 40 and 42 connecting the ATM switch 2 to the data destinations 18, 20.

Data from a plurality of sources may be communicated over an ATM network such as that illustrated in FIG. 1, by routing ATM cells from data sources to destinations in accordance with the principles of ATM known to those skilled in the art. As will be appreciated the data sources associated with users of the ATM network may generate data in accordance with different transmission requirements such as delay and data rate. Therefore, on an ATM network data sources may be generating delay critical data which may also require high bandwidth such as data representative of video signals. However, in order to illustrate the present invention, FIG. 1 shows a plurality of sources which represent delay tolerant data sources.

Within the ATM network shown in FIG. 1, each of the ATM switches 1, 2, operates to allocate transmission bandwidth to data sources 4, 6, 8, 10, 12, in accordance with a temporally fluctuating ABR bandwidth. The ABR bandwidth is calculated by subtracting the cell rates demanded by sources using a bearer for delay critical data and therefore bandwidth associated with delay critical data, from the total network links bandwidth provided by a combination of the ATM switches 1, 2. The remaining available system bandwidth or ABR bandwidth is thereafter distributed amongst the data sources in accordance with pre-negotiate transmission parameters representative of an agreed set of communication parameters for the data source's transmission of cells over the ATM network. In order to effect this allocation of ABR bandwidth to the data sources, a resource manager 44, operates within the ATM switches 1, 2. Operation of resource managers will now be described with reference to the ATM switch 1, shown in FIG. 1.

Amongst the ATM cells transmitted from each of the data sources 4, 6, 8, 10, are resource management cells. Each of the resource management cells comprises a set of data fields which are used to communicate control information from the data sources 4, 6, 8, 10, to the ATM switch 1 and also from the ATM switch 1 to the data sources via a return path from the ATM switch 1 to, for example, a data destination address 22. Thus, resource management cells in the forward direction, that is from the data sources 4, 6, 8, 10, to the ATM switch 1 are designated F-RM in FIG. 1, whereas resource management cells communicated in the backward direction are known as backward resource management cells designated B-RM in FIG. 1. Within the fields of resource management cells, there are included the following data fields: A Current Cell Rate (CCR) data field representative of a maximum rate at which the data source is permitted to communicate cells to the ATM switch 1. A Minimum Cell Rate (MCR) field which is representative of a minimum cell rate which the ATM switch 1 guarantees it will provide the data source. An Initial Cell Rate (ICR) field which is representative of a maximum data rate which the source agrees it will not exceed when it becomes active from an idle state. An Explicit Rate (ER) field representative of a rate at which the data source would like to transmit cells.

In operation, the resource manager 44, within the ATM switch 1, uses the resource management cells in order to control the rate at which data sources 4, 6, 8 ,10, transmit data via the transmission means 24, 26, 28, 30. This is achieved by manipulating the CCR and ER fields in accordance with a temporal state of ABR bandwidth which is currently available at the ATM switch 1. For example, in the case where data source 10, changes from an idle state, where it is not transmitting data, to an active state, the data source 10, may transmit at the initial cell rate. Therefore, the RM cells sent at that time may have CCR=ICR. If the ATM switch 1, which receives the cells via the transmission means 30, has sufficient capacity to communicate the cells from the data source 10 to the destinations, it will allocate ABR bandwidth to the data source 10 by setting the value of the ER field in the B-RM cells to a corresponding cell rate. However, where there is insufficient ABR bandwidth available to the ATM switch 1, the resource manager 44 will adjust the ER field in accordance with the ABR bandwidth available. The ER field is adjusted in the backward resource management cell which is communicated to the destination 22. This has the effect of communicating to the source the rate it is now permitted to transmit cells. This becomes the new ACR of the source. When cells are subsequently generated, the CCR in the F-RM cells takes on a value of the new ACR. The CCR may be equal to the MCR for the data source. However, since the data source will continue to generate data at a rate which may exceed the minimum cell rate, the data source 10 maintains an ER in the forward resource management cell which is higher than the CCR. When further ABR bandwidth becomes available at the ATM switch 1, the resource manager 44, operates to adjust the ACR/CCR in accordance with this bandwidth, thereby providing an increase to the cell rate for the data source 10. The adjustment in the ACR is communicated to the resource manager associated with the data sources or the telecommunications switch by changing the value of ER in the resource management cell. It is important to appreciate therefore that the value of ER in the resource management cells has different significance in dependence upon whether this is in the forward-RM cells or the backward-RM cells. In the F-RM cells, the ER field denotes a demanded cell rate from the source. In the B-RM cells, the ER field represents a new value of ACR to be used by the source.

As any ATM network may be comprised of a plurality of switches, the CCR may be changed many times between source and destination. As such, a different value of ACR maybe associated with each switch through which data is routed. It is the ACR which becomes the Current Cell Rate (CCR) contained in the F-RM cell.

In a public telecommunications system, there may be a considerable delay between a data source transmitting data cells at an Initial Cell Rate (ICR), and the receipt by the data source from a resource manager within an ATM switch of the backward resource management cell, instructing the data source to reduce the rate of sending ATM cells. For this reason, ATM switches in public networks require considerable data storage capacity at the ATM switch, in order to buffer ATM cells arriving at the ATM switch, when the ATM switch is congested due to a lack of available communications bandwidth. A similar situation may occur in a private ATM telecommunications network, or in any situation where a cell rate generated by a data source exceeds the available ABR communications bandwidth. This also suggests a requirement for substantial data storage capacity. However, data storage is expensive, and furthermore must be provided for each data source and destination coupled to the ATM switch. For this reason an available bandwidth allocation process operated by a bandwidth allocator 46, within the ATM switch 1, operates to share the ABR communications bandwidth available to the ATM switch 1, between the data sources without a requirement for substantial data storage capacity. This process will be described as follows.

The bandwidth allocator 46, is provided with the total available network links bandwidth for ABR services, which is calculated in accordance with a sum of all cell rates or bandwidth requirements allocated to delay critical services, subtracted from the network links bandwidth. The bandwidth allocator 46, thereafter operates to calculate the useable ABR bandwidth or useable ABR cell rate on a pessimistic basis by subtracting from the total available ABR bandwidth, each Initial Cell Rate associated with the data sources 4, 6, 8, 10, which are at a given instant idle. A data source 4, 6, 8, 10, is considered to be idle, if it has not generated data cells in a continuous period of at least one minimum cell rate period. This calculation of the useable bandwidth can be seen as reflecting a worse case scenario since this assumes that all idle data sources would become active within the next predetermined time period and transmit at their Initial Cell Rates. This event can be seen to have a relatively low probability of occurring. Calculation of the available ABR bandwidth is therefore represented as equation 1, where $A_\phi$ is the total ABR bandwidth.

$$A_{usable} = A_\phi - \Sigma ICR_i(idle) \tag{1}$$

If $\Sigma ER_i(switch) < A_{usable}$
then $$ER_i(switch) = CCR_i + AIR_i \tag{2}$$

else $$ER_i(switch) \propto A_{usable} \times \frac{MCR_i}{\Sigma MCR_i}$$

Allocation of the useable ABR bandwidth thereafter proceeds as follows:

The cell rate allocated to each data source 4, 6, 8, 10, by the switch 1, that is the value of $ER_i$ in the B-RM, are summed to provide a representation of the total demand on the useable ABR bandwidth. If the total demand is less than the useable ABR bandwidth, then there is sufficient bandwidth available to the ATM switch 1, to communicate data and so bandwidth is allocated to the data sources. This is achieved by changing the ER cell rates, in the B-RM by a fixed cell rate increment known as the Additive Increase Rate (AIR). If, however, the total demand on the useable ABR bandwidth exceeds that which is available, then the bandwidth allocator 46, operates to calculate a 'fair share' of the available bandwidth in accordance with either the ER rates communicated to the ATM switch 1 in the F-RM, or the MCR cell rate guarantee by the ATM switch 1 to the data sources 4, 6, 8, 10, as given by equation (2). Furthermore, the bandwidth allocator 46, may operate to share the ABR bandwidth between sources on a basis of an equal share allocated to each active source. A share of the useable ABR bandwidth may be furthermore calculated in accordance with other schemes, such as weighting, in combination with the ICR. Allocation of the useable ABR bandwidth to the data sources is described mathematically in equation (2), for the case where the fair share calculation is done on a basis of the Minimum Cell Rate.

Once a share of the useable ABR bandwidth has been calculated for each data source, this is compared to an increase of the cell rate which the data source would have received, if the cell rate had been increased in accordance with the Additive Increase Rate (AIR). If the share of the useable ABR bandwidth as calculated by the bandwidth allocator 46, is greater than the AIR, then only the AIR is allocated to increase the allocated cell rate. If less than the AIR, then the calculated share of the useable ABR bandwidth is allocated to the source. This further check on the change in cell rate to be allocated to a data source is provided to facilitate flow control of ATM cells further into the network.

Congestion may occur at any of a plurality of switches in the ATM network. Therefore, although a useable ABR bandwidth at a particular switch may be sufficient to provide an increase in the ACR cell rate of a source, the ACR of a source is only increased in accordance with the useable ABR bandwidth, if the ER of the B-RM cells is greater than the new ACR cell rate which is to be set by the particular switch. In other words, although the switch 1 may have sufficient useable ABR bandwidth to increase the cell rate of a source, the increase is only made if switches elsewhere in the network are able to support this increase in cell rate. To this end the cell rate of a source is only increased, if the newly calculated ER for inclusion in B-RM cells which sets the ACR, is less than the ER cell rate already present in the B-RM cells, which is indicative of a situation in which the switches further into the network will not become congested by the increase in cell rate from the source.

As will be appreciated by those skilled in the art, various modifications may be made to the embodiment and arrangement hereinbefore described whilst still falling within the scope of the present invention. In particular, the ABR bandwidth for allocation to the data sources may be calculated by scaling a sum of all the ICR cell rates for the idle data sources by a predetermined constant, to reflect a small probability of the idle data sources becoming active at the ICR cell rates. Furthermore, the telecommunications system may be a broadband ISDN system, and other resource management and signalling means may be effected other than the use of resource management cells.

What is claimed is:

1. A method of allocating a network bandwidth in a network telecommunications system comprising a plurality of data sources coupled thereto, at least one data destination and at least one switch for switching said data sources to said at least one data destination, the method comprising the steps of:

(i) providing a network bandwidth;

(ii) representing the network bandwidth as a cell rate;

(iii) allocating bandwidth to delay-critical data sources;

(iv) subtracting from the network bandwidth a sum of all cell rates allocated to said delay-critical data sources to provide an available bit rate for delay-tolerant data sources from the remaining network bandwidth;

(v) determining an initial cell rate for each of said data sources which is idle, said initial cell rate being representative of a maximum cell rate at which data from said idle sources may initially be communicated when changing from an idle to an active state;

(vi) summing said initial cell rates for all idle sources;

(vii) subtracting said sum of initial cell rates from said available bit rate to provide a useable available bit rate;

(viii) summing each cell rate demanded by each of said data sources to provide a total demanded cell rate;

(ix) comparing said total demanded cell rate with said useable available bit rate; and (x) if said useable available bit rate is greater than said total demanded cell rate, apportioning an increase in said cell rate at which said active sources communicate data in proportion to an additive increase rate; and (xi) otherwise allocating a share of said usable available bit rate to each of said data sources in accordance with the cell rate demanded from each of said data sources.

2. A method of allocating a network bandwidth as claimed in claim 1, wherein step (xi) includes allocating said useable available bit rate so that each data source receives a substantial equal share thereof.

3. A method of allocating a network bandwidth as claimed in claim 1, wherein step (xi) includes allocating said useable available bit rate in proportion to a pre-arranged minimum cell rate which said at least one switch is arranged to provide said data source.

4. A method of allocating a network bandwidth as claimed in claim 1, wherein step (xi) includes allocating said useable available bit rate in proportion to said initial cell rates.

5. A method of allocating a network bandwidth in a network telecommunications system comprising a plurality of data sources coupled thereto, at least one data destination and at least one switch for switching said data sources to said at least one data destination, the method comprising the steps of:

(i) providing a network bandwidth;

(ii) representing the network bandwidth as a cell rate;

(iii) allocating bandwidth to delay-critical data sources;

(iv) subtracting from the network bandwidth a sum of all cell rates allocated to said delay-critical data sources to provide an available bit rate for delay-tolerant data sources from the remaining network bandwidth;

(v) determining an initial cell rate for each of said data sources which is idle, said initial cell rate being representative of a maximum cell rate at which data from said idle sources may initially be communicated when changing from an idle to an active state;

(vi) summing said initial cell rates for all idle sources;

(vii) subtracting said sum of initial cell rates from said available bit rate to provide a useable available bit rate;

(viii) summing each cell rate demanded by each of said data sources to provide a total demanded cell rate;

(ix) comparing said total demanded cell rate with said useable available bit rate;

(x) comparing a cell rate allocated by switches within said network telecommunications system to each of said data sources;

(xi) determining if said useable available bit rate is greater than said total demanded cell rate;

(xi) determining if said cell rate allocated by other switches in the network is greater than that to be allocated; and (xi) apportioning an increase in said cell rate at which said active sources communicate data in proportion to an additive increase rate in accordance with a share of said available cell rate only if both said useable available bit rate is greater than said total demanded cell rated and said cell rate allocated by other switches is greater than that to be allocated.

6. A method of allocating a network bandwidth in a network telecommunications system comprising a plurality of data sources coupled thereto, at least one data destination and at least one switch for switching said data sources to said at least one data destination, the method comprising the steps of:

(i) providing a network bandwidth;

(ii) representing the network bandwidth as a cell rate;

(iii) allocating bandwidth to delay-critical data sources;

(iv) subtracting from the network bandwidth a sum of all cell rates allocated to said delay-critical data sources to provide an available bit rate for delay-tolerant data sources from the remaining network bandwidth;

(v) determining an initial cell rate for each of said data sources which is idle, said initial cell rate being representative of a maximum cell rate at which data from said idle sources may initially be communicated when changing from an idle to an active state;

(vi) summing said initial cell rates for all idle sources;

(vii) subtracting said sum of initial cell rates from said available bit rate to provide a useable available bit rate;

(viii) summing each cell rate demanded by each of said data sources to provide a total demanded cell rate;

(ix) comparing said total demanded cell rate with said useable available bit rate;

(x) apportioning an increase in said cell rate at which said active sources communicate data in proportion to an additive increase rate if said useable available bit rate is greater than said total demanded cell rate;

(xi) comparing each share of said useable available bit rate to be allocated to said data sources with said additive increase rate; and (xii) providing said data sources with an increased cell rate in accordance with the share of said available bit rate when said share is less than said additive increase rate or in accordance with said additive increase rate.

* * * * *